(12) United States Patent
Shimaya (10) Patent No.: US 6,485,385 B2
(45) Date of Patent: Nov. 26, 2002

(54) SILENT CHAIN

(75) Inventor: Kazuhiko Shimaya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 7 days.

(21) Appl. No.: 09/810,896

(22) Filed: Mar. 17, 2001

(65) Prior Publication Data

US 2001/0022074 A1 Sep. 20, 2001

(30) Foreign Application Priority Data

Mar. 17, 2000 (JP) ........................................ 2000/075743

(51) Int. Cl.$^7$ ............................................. F16G 13/02
(52) U.S. Cl. ........................................................ 474/213
(58) Field of Search ................................ 474/212, 213, 474/214, 215, 216, 217

(56) References Cited

U.S. PATENT DOCUMENTS

| | | | |
|---|---|---|---|
| 2,069,591 A | * 2/1937 | Pierce | ........................ 474/217 |
| 4,227,425 A | 10/1980 | Bendall | |
| 4,906,224 A | * 3/1990 | Reber | ........................ 474/213 |
| 5,989,141 A | * 11/1999 | Kozakura et al. | ........... 474/206 |

* cited by examiner

Primary Examiner—Jack Lavinder
Assistant Examiner—Devon Kramer (57) ABSTRACT

Three structural components jointly constituting a single guide link of a silent chain, i.e., two guide plates, at least one guide link plate disposed between the guide plates, and two round connector pins press-fitted in the guide plates are constructed to satisfy the expression $$(Pm+Dm-Dp')-Pg'=0$$

where Pm is the link plate pitch represented by the distance between pin hole centers in the guide link plate, Dm is the inside diameter of the pin holes in the guide link plate, Dp' is the outside diameter between the round connector pins press-fitted in each guide plate, and Pg' is the post-press-fitting guide plate pitch represented by the distance between pin hole centers in each guide plate press-fitted with the round connector pins. In an assembled condition of the silent chain, each round connector pin extends straight with its outer peripheral surface being in contact with the inner peripheral surface of the mating pin hole of the guide link plate.

2 Claims, 5 Drawing Sheets

SILENT CHAIN

BACKGROUND OF THE INVENTION

The present invention relates to a silent chain having a large number of interleaved link plates articulately connected by round connector pins in an endless fashion.

Silent chains of the type concerned have guide links and articular links alternately arranged in the direction of the length of the silent chain and they are articulately connected together in an endless fashion by means of round connector pins. The guide links each have a pair of guide plates and at least one guide link plate disposed laterally between the guide plates. The guide plates and guide link plate each have a pair of pin holes spaced in the longitudinal direction of the chain. The articular links each have at least two laterally aligned articular link plates each having a pair of pin holes spaced in the longitudinal direction of the chain, rile number of the articular link plates being one more than the number of the guide link plates. The articular link plates in each of the articular links are interleaved with the guide plates and guide link plates in the adjacent link plate.

In assembly, one of the pin holes, located near a leading end (as viewed in the advancing direction of the chain) of each guide plate of one guide link and one of the pin holes, located near a leading end of the guide link plate of the same guide link are laterally aligned with one of the pin holes, located near a trailing end (as viewed in the advancing direction of the chain) of each articular link plate of the adjacent articular link, and one round connector pin is inserted through the laterally aligned holes in the guide plates, guide link plate and articular link plates, so that the guide links and the articular links are connected together in an endless fashion. The outside diameter of the round connector pin is made smaller than the inside diameter of the pin holes of the guide link plate and articular link plates so as to define a space or clearance between the outer peripheral surface of the connector pin and the inner peripheral surface of the mating pin holes of the guide and articular link plates, so that the adjacent guide and articular links can bend or articulate about the round connector pin when the chain wraps around a sprocket. The round connector pin is press-fitted with the guide plates to avoid unintentional disassembly of the silent chain.

Japanese Patent Laid-open Publication No. (HEI) 11-201238 shows a conventional silent chain, in which the pitch of the guide plates (represented by the distance between pin hole centers in each guide plate) is initially made larger than the pitch of the guide and articular link plates (represented by the distance between pin hole centers in each link plate). After the assembly of the silent chain, the silent chain is prestressed to plastically deform the link plates to such an extent that the pitch of the guide plates and the pitch of the link plates are substantially equal with each other.

Figure 8:
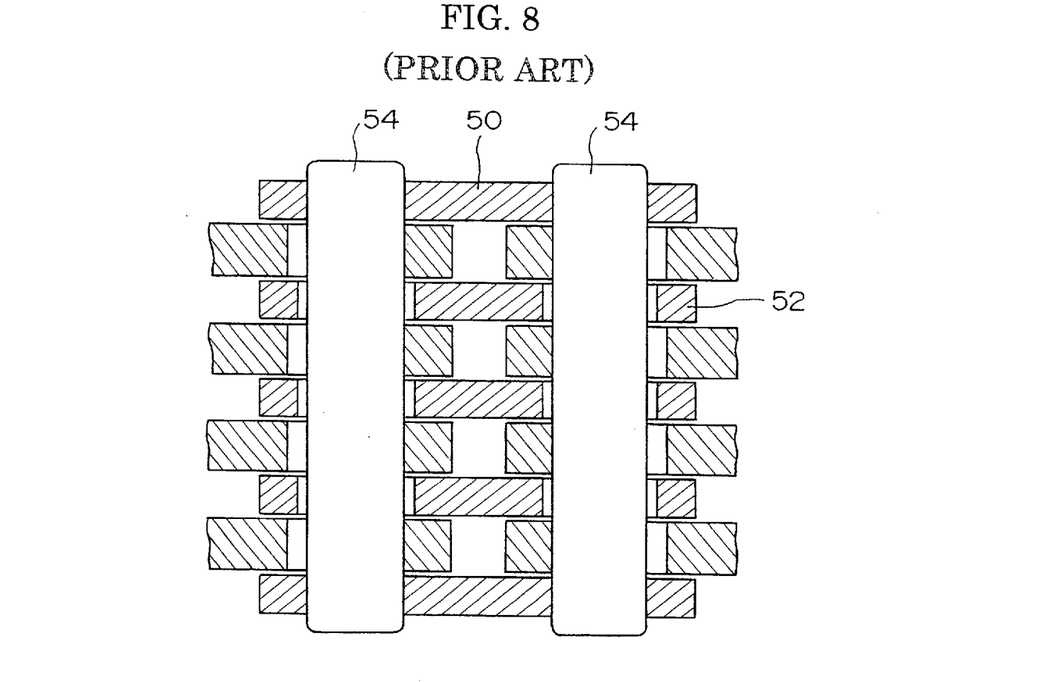
FIG. 8 is a cross-sectional view showing a part of a conventional silent chain.

However, as shown here in FIG. 8, since the pitch of the guide plates 50 is equal to the pitch of the guide link plates 52, an annular space is defined between the outer peripheral surface of each round connector pin 54 and the inner peripheral surface of the mating pin hole of each guide link plate 52 in concentric relation to the round connector pin 54. With this arrangement, when the conventional chain is subjected to a tensile force, the tensile force in each guide link acts concentratedly on the guide plates 50.

Figure 9:
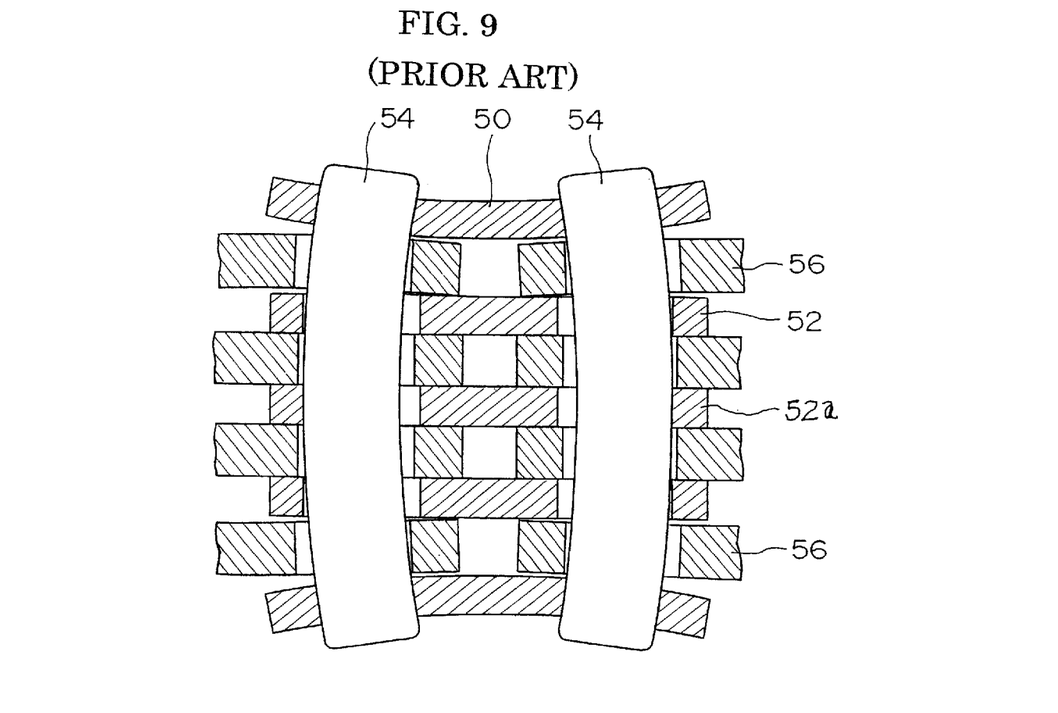
FIG. 9 is a view similar to FIG. 8, but showing a condition in which the conventional silent chain is subjected to a tensile force.

As a result, the guide plates 50 are deformed into a bow-like shape and the round connector pins 54 are bent, as shown in FIG. 9. The amount of deformation of the guide plates and round connector pins may increase until the outer peripheral surface of each round connector pin 54 contacts the inner peripheral surface of the mating pin hole of one guide link plate 52a which is located at the center in the transverse direction of the guide link.

With the outer peripheral surface of the round connector pin being in contact with the inner peripheral surface of the pin hole in the central guide link plate 52a, in the guide links, a tensile force acting on the silent chain is born solely by the guide plates 50 and the central guide link plate 52a. In the articular links, due to the bend or deformation of the round connector pins 54, the tensile force acting on the silent chain is born solely by two outermost articular link plates 56, 56.

The conventional silent chain of the foregoing construction is disadvantageous for the reasons enumerated below.
(1) The round connector pin is susceptible to bending and repeated bending force is likely to cause fatigue.
(2) Due to the bend or deformation of the round connector pin, the pitch of the guide links and the pitch of the articular links are caused to change with the result that the noise produced when the silent chain engages the sprocket increases.
(3) Since, in the guide links, the tensile force acting on the silent chain is concentrated on the guide plates, the guide plates are likely to be damaged or broken.
(4) Due to the bend of the round connector pin, the tensile force acting on the silent chain is concentrated on the central guide link plate, which leads to reduction of the service life of the silent chain as a whole.
(5) The service life of the silent chain as a whole is further cut down by two outermost articular link plates, which are subjected to stress concentration when a tensile force is applied to the silent chain.
(6) with the round connector pin being bent, each individual link plate is more or less subject to stress concentration. When the concentrated stress exceeds the elastic limit of the material of the link plate, the link plate is plastically deformed or otherwise damaged.

SUMMARY OF THE INVENTION

It is, accordingly, an object of the present invention to provide a silent chain with round connector pins, which has structural features enabling a tensile force acting on the silent chain to act concurrently and uniformly on the guide plates and the link plates in each guide link.

To achieve the foregoing object, there is provided, in accordance with the present invention, a silent chain comprising guide links and articular links alternately arranged in the longitudinal direction of the chain. Each of the guide links has a pair of guide plates and at least one guide link plate disposed laterally between the guide plates. The guide plates each have a pair of pin holes spaced in the longitudinal direction of the chain, and the guide link plate has a pair of pin holes spaced in the longitudinal direction of the chair. Each of the articular links has at least two laterally aligned articular link plates each having a pair of pin holes spaced in the longitudinal direction of the chain. The number of the articular link plates is one more than the number of the guide link plates. Round connector pins are inserted through the pin holes in the guide plates, the pin holes in ea h guide link plate and the pin holes in the articular link plates so as to connect the guide links and the articular links in an endless fashion with the guide link plates and he articular link plates being interleaved with each other.

The pin holes in each of the guide plates have an inside diameter smaller than an outside diameter of the round connector pins, the round connector pins being press-fitted with the guide plates. The pin holes in each guide link plate have an inside diameter larger than the outside diameter of the round connector pins. The pitch or distance between pin hole centers in each of the guide plates is larger than the pitch or distance between pin hole centers in each guide link plate. Two adjacent ones of the connector pins, inserted through the pin holes in each guide link plate and pressed fitted in tie pin holes in each of the guide plates, have an outside distance substantially equal to an outside distance between the pin holes in the guide link plate.

In a pre-press-fitting state in which the round connector pins are not yet connected by press-fitting to the guide plates, the silent chain of the present invention is constructed to satisfy the expression (1)

$$Pg+Dg \approx Pm+Dm \quad (1)$$

where Pg is the guide plate pitch represented by the distance between pin hole centers in each guide plate, Dg is the inside diameter of the pin holes of each guide plate, Pm is the link plate pitch represented by. the distance between pin hole centers in the guide link plate, and Dm is the inside diameter of the pin holes in the guide link plate.

It is preferable that the left side and the right side of the expression (1) are made physically equal to each other as expressed by the sign "=", rather than nearly equal to each other as expressed above by the sign "$\approx$".

When the round connector pins are press-fitted with the guide plates, the outside diameter of the round connector pins and the inside diameter of the pin holes in the guide plates are changed due to elastic deformation. To optimize the design of the silent chain, the amount of elastic deformations of the round connector pins and guide plates should preferably be considered.

In a post-press-fitting state in which the round connector pins are already connected by press-fitting to the guide plates, the silent chain of the present invention is constructed to satisfy the expressions (2)–(4)

$$L1 \approx L2 \quad (2)$$

$$Pg'+Dp' \approx Pm+Dm \quad (3)$$

$$(Pm+Dm-Dp')-Pg' \approx 0 \quad (4)$$

where L1 is the outside distance between the round connector pins press-fitted in the pin holes in each guide plate, L2 is the outside distance between the pin holes in the guide link plate, Pg' is the post-press-fitting guide plate pitch represented by the distance between pin hole centers in each guide plate press-fitted with the round connector pins, Dp' is the outside diameter of the round connector pins press-fitted in each guide plate, Pm is as defined above, and Dm is as defined above.

It is preferable that in each of the foregoing expressions (2)–(4), the left side and the right side are made physically (Equal to each other as expressed by the sign "=", rather than nearly equal to each other as expressed above by the sign "$\approx$".

However, It is difficult to make the left side and the right side of each of the expressions (1)–(4) physically equal to each other. Accordingly, in the silent chain of the present invention, the left side of the expression (4) is preferably made less than 0.5% of the pitch of the silent chain (chain pitch).

The term "chain pitch" used herein represents the center distance between the adjacent round connector pins. The term "guide plate pitch Pg" used herein represents the distance between pin hole centers in each guide plate before the silent chain is prestressed. Similarly, the term "link plate pitch Pm" used herein represents the distance between pin hole centers in each guide link plate before the silent chain is prestressed. The term "post-press-fitting guide plate pitch Pg'" used herein represents the distance between pin hole centers in each guide plate including the amount of elastic deformations caused in the round connector pins and the guide plate due to press-fitting connection.

By thus constructing the silent chain, in each guide link, the round connector pins press-fitted in the guide plates extent straight with their outer peripheral surface being in contact with the inner peripheral surfaces of the pin holes in the guide link plate. When the silent chain is subjected to a tensile force, the tensile force acts on the guide plates and the guide link plate simultaneously. Thus, the round connector pins do not undergo elastic deformation or bending, and the guide plates and the guide link plate (particularly, the central guide link plate when plural guide link plates are used) are completely free from stress concentration.

BRIEF DESCRIPTION OF THE DRAWINGS

A certain preferred embodiment of the present invention will now be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
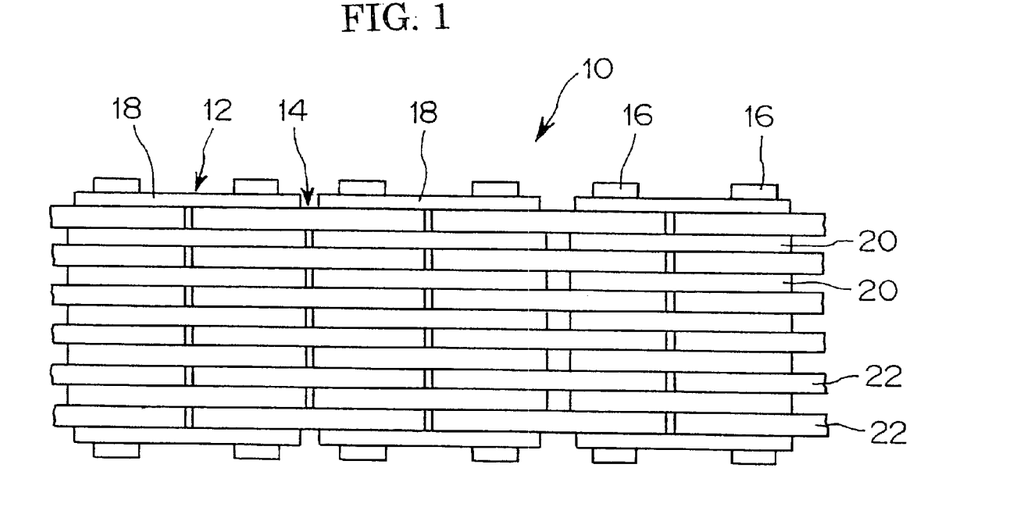
FIG. 1 is a fragmentary plan view of a silent chain according to one embodiment of the present invention.
Figure 2:
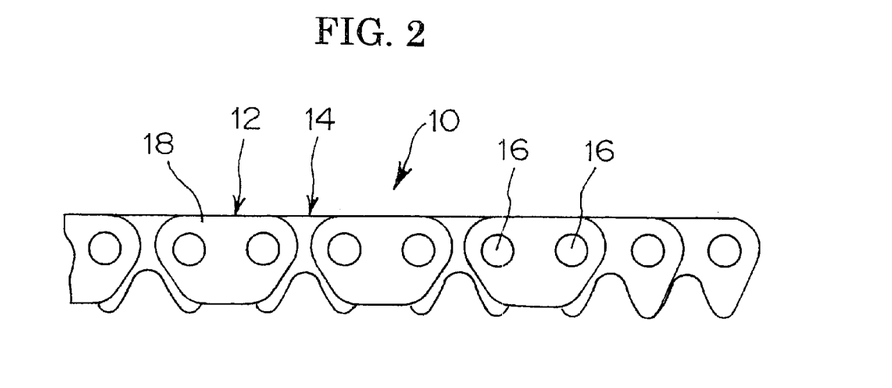
FIG. 2 is a front elevational view of the silent chain shown in FIG. 1.

Referring now to the drawings and FIGS. 1 and 2 in particular, here is shown a silent chain 10 according to an embodiment of the present invention. The silent chain 10 includes guide links 12 and articular links 14 alternately arranged in he longitudinal direction of the silent chain 10. The guide links 12 and the articular links 14 are articulately connected together in an endless fashion by means of round connector pins 16.

The guide links 12 each have a pair of guide plates 18, 18 and at least one guide link plate 20 (five guide link plates being used in the illustrated embodiment) disposed laterally between the guide plates 18. The articular links 14 each have at least two laterally aligned articular link plates 22 (six guide link plates being used in the illustrated embodiment), the number of the articular link plates 22 being one more than the number of the guide link plate 20. In the illustrated embodiment, the guide plates 18 and the guide link plates 20 have the same thickness, the articular link plates 22 are larger in thickness than the guide link plates 20. The articular link plates 22 and the guide link plates 20 may have the same thickness. Additionally, the guide plates 18 may be smaller in thickness than the guide link plates 20 and the articular link plates 22.

The guide plates 18 each have a pair of pin holes 24 (FIG. 3) spaced in the longitudinal direction of the silent chain 10, and the guide link plate 20 has a pair of pin holes 26 (FIG. 4) spaced in the longitudinal direction of the silent chain 10. Similarly, the articular link plates 22 each have a pair of pin holes 28 (FIG. 4) spaced in the longitudinal direction of the silent chain 10.

In assembly, one of the pin holes 24, located near a leading end (as viewed in the advancing direction of the chain) of each guide plate 18 of one guide link 12 and one of the pin holes 26, located near a leading end of each guide link plate 20 of the same guide link 12 are laterally aligned with one of the pin holes 28, located near a trailing end (as viewed in the advancing direction of the chain) of each articular ink plate 22 of the adjacent articular link 14, and one round connector pin 16 is inserted through the laterally aligned holes 24, 26, 28 in the guide plates 18, guide link plates 20 and articular link plates 22, so that the guide links 12 and the articular links 14 are connected together in an endless fashion.

Figure 4:
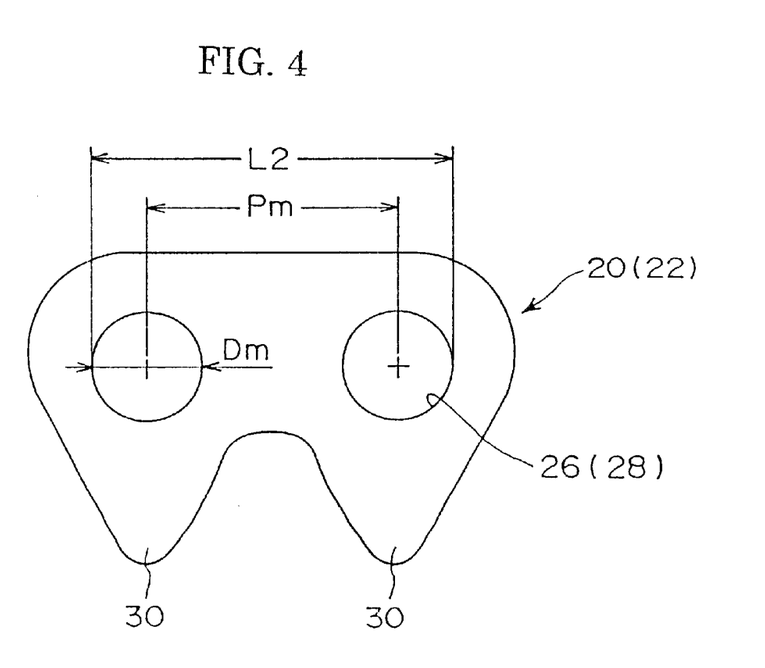
FIG. 4 is an enlarged front elevational view of a guide link plate or an articular link plate used in the silent chain.

A shown in FIG. 4, the link plates 20, 22 each have a pair of teeth 30 formed into a bifurcated configuration for meshing with teeth of a sprocket (not shown). In the illustrated embodiment, the guide link plate 20 and the articular link plate 22 have the same outside configuration or profile. These link plates 20, 22 may have different tooth profiles.

Figure 3:
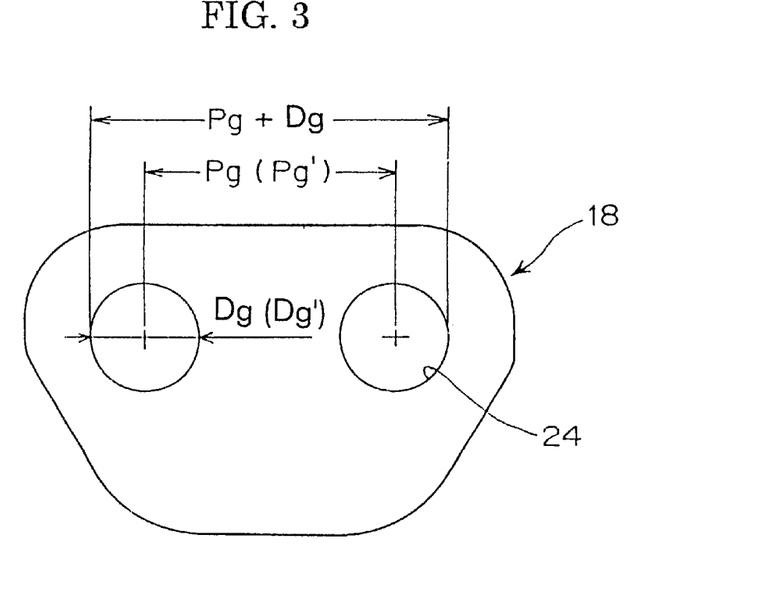
FIG. 3 is an enlarged front elevational view of a guide plate used in the silent chain.

As shown in FIG. 3, the guide plate 18, before being press-fitted with the round connector pins 16 (FIG. 2), has a pitch Pg represented by the distance between pin hole centers of the guide plate 18, and an inside diameter Dg of the pin holes 24 slightly smaller than the outside diameter Dp of the round connector pins 16. When the round connector pins 16 are press-fitted in the pin holes 24 of the guide plate 18, the connector pins 16 undergo elastic deformation and the initial diameter Dp if the round connector pins 16 is reduced to Dp'. Similarly, the guide plate 18 also undergoes elastic deformation And the inside diameter Dg of the pin holes 24 is enlarged up to Dg'. The pitch Pg of the guide plate 18 slightly changed to Pg'.

As shown in FIG. 4, the guide link plate 18 has a pitch Pm represented by the distance between pin hole centers of the guide link plate 20, and an inside diameter Dm of the pin holes 26 slightly larger than the outside diameter Dp of the round connector pins 16.

In the silent chain of the present invention, the round pins 16, guide plates 18 and guide link plates 20 are constructed to satisfy the following expressions (1)–(4)

$$Pg+Dg \approx Pm+Dm \quad (1)$$

$$L1 \approx L2 \quad (2)$$

$$Pg'+Dp' \approx Pm+Dm \quad (3)$$

$$(Pm+Dm-Dp')-Pg' \approx 0 \quad (4)$$

where Pg, Dg, Pm, Dm, Pg' and Dp' are as defined above, L1 is the outside distance between the round connector pins 16 press-fitted in the pin holes 24 in each guide plate 18, and L2 is the outside distance between the pin holes 26 in the guide link plate 20.

Figure 5:
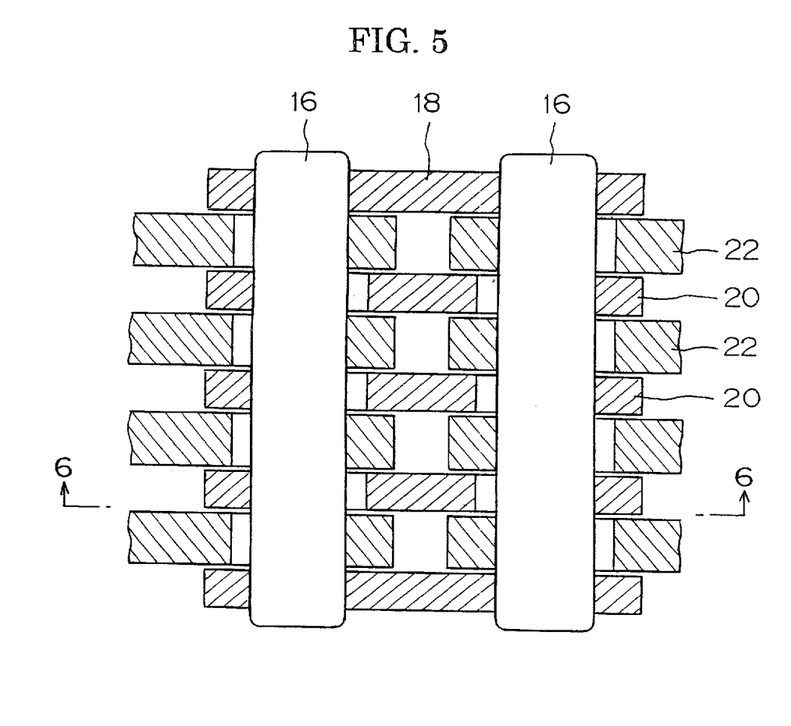
FIG. 5 is a cross-sectional view showing an assembled state of the silent chain in which round connector pins press-fitted in pin holes in the guide plate.
Figure 6:
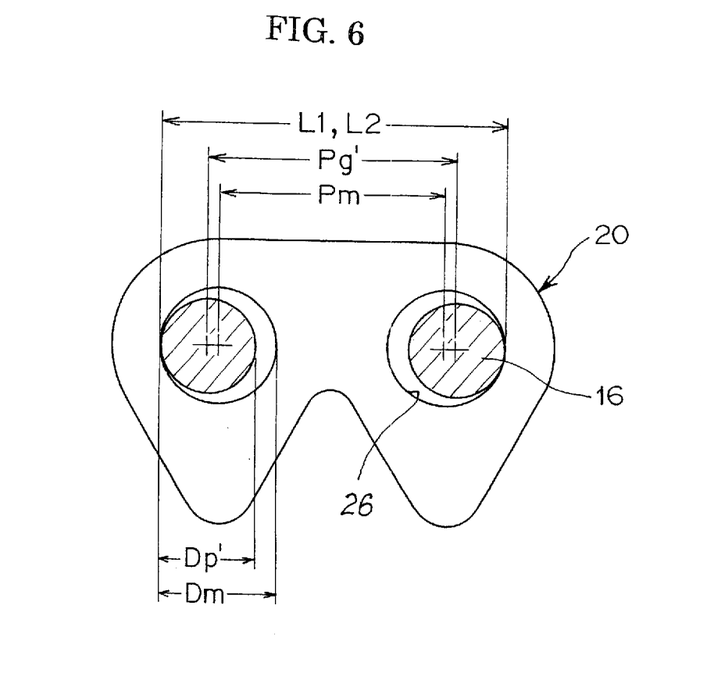
FIG. 6 is a cross-sectional view taken along line 6—6 of FIG. 5.

By thus constructing the three components 16, 18, 20, the silent chain 10, in an assembled state such as shown in FIGS. 5 and 6, has round connector pins 16 extending straight across the width of the silent chain, with the outer peripheral surfaces of the round connector pins 16 being in contact with the inner peripheral surfaces of the pin holes 26 (FIG. 6) of the guide link plate 20.

A microscopic observation of the positional relationship between the connector pins 16 and the pin holes 26 may indicate three different phases. In one phase, the outer peripheral surfaces of the connector pins 16 separate from the inner peripheral surface of the pin holes 26 with a slight gap therebetween. In another phase, the outer peripheral surfaces of the connector pins 16 contact the inner peripheral surfaces of the pin holes 26 with no stress exerted thereon. In still another phase, the outer peripheral surfaces of the connector pins 16 contact the inner peripheral surface of he pin holes 26 with a slight stress exerted thereon. The sign "≈" used in the expressions (1)–(4) means that due to manufacturing tolerances, assembling errors and so on, the left side and the right side in each expression are hardly equalized in a physical sense. In practice, the outer peripheral surfaces of the connector pins 16 and the inner peripheral surface of the pin holes 26 are either in a confronting relation with a slight clearance therebetween, or in contact with each other with a slight stress exerted thereon.

Based on the expression (4), an experiment was made to determine conditions required for the round connector pins 16 and the pin holes 26 to insure satisfactory operation of the silent chain 10.

Figure 7:
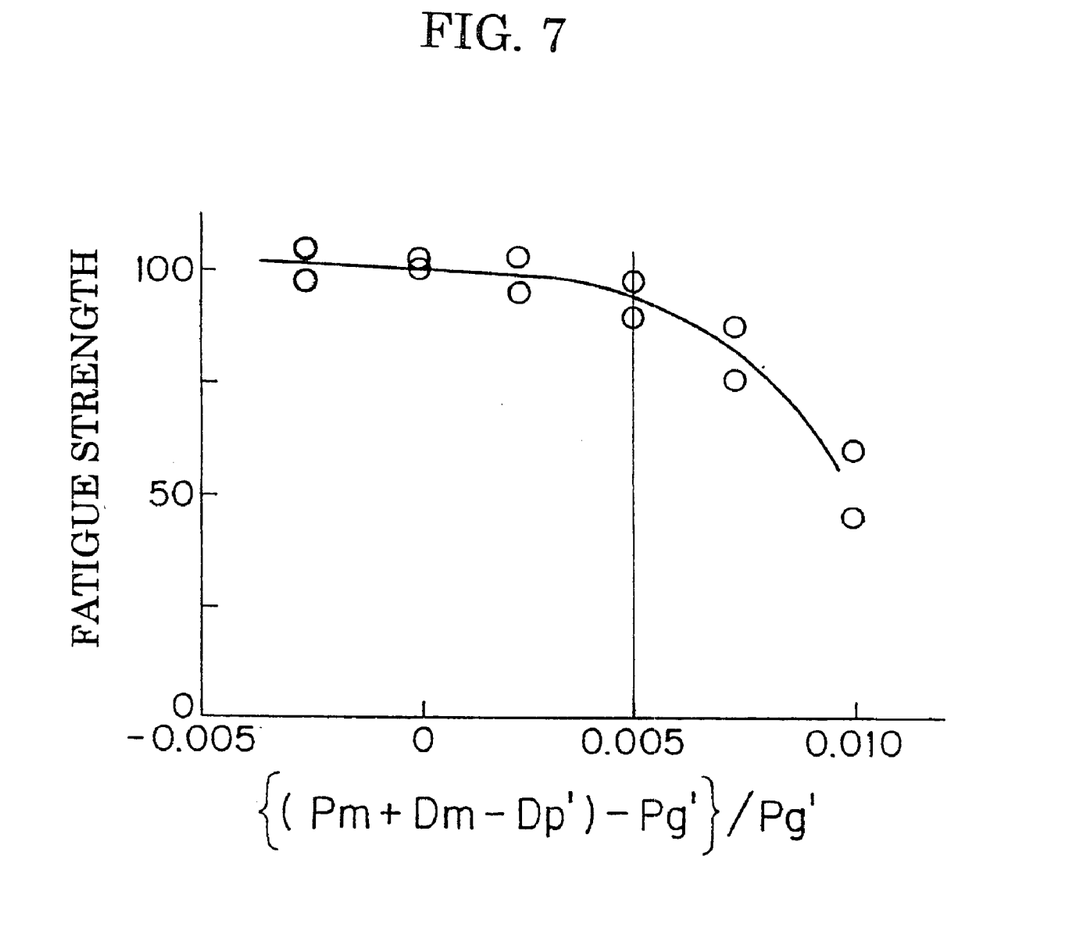
FIG. 7 is a graph showing the fatigue strength of the silent chain.

In the experiment, the silent chain 10 of the present invention, stretched between two sprockets connected to parallel spaced shafts, was driven at high speeds under loaded condition. The result of the experiment is shown in FIG. 7. In a graph shown in FIG. 7, the horizontal axis represents values obtained by dividing the left side of the expression (4) by the chain pitch, i.e., the pitch Pg' of the guide plates 18. This also can be expressed as $$((Pm+Dm-Dp')-Pg')/Pg' \quad (4)$$

The vertical axis of the graph shown in FIG. 7 represents the fatigue strength. The fatigue strength value 100, corresponds to 3 kN. When the value obtained from the expression (5) is positive, this means that the outer peripheral surfaces of the round connector pins 16 and the inner peripheral surfaces of the pin holes 24 are in confrontation with a clearance therebetween. As the clearance becomes larger, the fatigue strength gradually decreases. When the value obtained from the expression (5) is more than +0.005, the fatigue strength drops abruptly and the guide link plate 20 causes fatigue failure at a small load.

In the case where the value obtained from the expression (5) is negative, this means that the outer peripheral surfaces of the round connector pins 16 and the inner peripheral surfaces of the pin holes 24 are in contact with each other with a certain degree of elastic deformation incurred. In this instance because for assembling the silent chain 10, two round connector pins 16 are first press-fitted in one of tie left and right guide plates 18, then assembled with the link plates 20, 22, the outside distance between the pin holes 26 of the guide link plates 20 becomes smaller than the outside distance between two round connector pins 16. Thus, scoring occurs between the round connector pins 16 and the guide link plates 20. Especially when the value from the expression (5) is less than −0.005, the assembly of the silent chain 10 becomes extremely difficult to achieve, and the scoring problem becomes serious.

Accordingly, the value from the expression (5) is preferably in the range of from −0.005 to +0.005 or from −0.005 Pg' to +0.005 Pg'.

When difficulties arise in establishing the above-mentioned clearance- and stress-free contact state between the outer peripheral surfaces of the round connector pins 16 and the inner peripheral surfaces of the pin holes 26 of the guide link plates 20, prescribed performance characteristics of the silent chain can be obtained by keeping the value from the expression (5) with the range as specified above.

The silent chain 10 is then prestressed. In this instance, since burrs and stains are removed from the silent chain 10, the range specified above for the value obtained from the expression (5) should be changed a little. More concretely when the silent chain is prestressed, the pitch Pg' of the guide plates 18 is slightly enlarged, and the pitch Pm (expression (5)) of the guide link plates 20 also is slightly enlarged. The lower limit of the above-specified range may be placed out of consideration because it is determined in view of manufacturing problems occurring before the silent chain is prestressed. A certain correction is needed for the upper limit of the above-specified range. However, since the pitches Pg' and Pm each act on the above range as a linear function, tie above range itself seems to be sufficient to design the silent chain.

As described above, when two round connector pins are connected by press-fitting to the guide plates, the outside distance between the round connector pins is equal to the outside distance between the pin holes in each guide link plate.

With this arrangement, the round connector pins are free from bend, and fatigue of the round connector pins, which may occur when subjected to a bending force, can be suppressed. Since each round connector pin can maintain its rectilinear profile, the guide links and the articular links are uniform in pitch. This means that the silent chain can engage the sprocket without causing pitch variations. Thus, the meshing accuracy of the silent chain can be increased, and the meshing sound of the silent chain can be reduced.

Additionally, since the round connector pins are free from bend, a tensile force exerted on the silent chain acts on the guide plates and the guide link plates uniformly and concurrently. Thus, all of the guide link plates are free from stress concentration, and so the service life of the silent chain as a whole can be prolonged.

Obviously, various minor changes and modifications of the present invention are possible in the light of the above teaching. It is therefore to be understood that within the scope of the appended claims, the present invention may be practiced otherwise than as specifically described.

What is claimed is:

1. A silent chain comprising:
   guide links and articular links alternately arranged in the longitudinal direction of said chain;
   each of said guide links having a pair of guide plates and at least one guide link plate disposed laterally between said guide plates, said guide plates each having a pair of pin holes spaced in the longitudinal direction of said chain, said guide link plate having a pair of pin holes spaced in the longitudinal direction of said chain;
   each of said articular links having at least two laterally aligned articular link plates each having a pair of pin holes spaced in the longitudinal direction of said chain, the number of said articular link plates being one more than the number of the guide link plate;
   round connector pins inserted through said pin holes in said guide plates, said pin holes in said guide link plate and said pin holes in said articular link plates so as to connect said guide links and said articular links in an endless fashion with said guide link plate and said articular link plates being interleaved with each other;
   said pin holes in each of said guide plates having an inside diameter smaller than an outside diameter of said round connector pins, said round connector pins being press-fitted with said guide plates;
   said pin holes in the guide link plate having an inside diameter larger than said outside diameter of the round connector pins;
   said pin holes in each of said guide plates having a center distance larger than a center distance of said pin holes in the guide link plate;
   two adjacent ones of said connector pins, inserted through said pin holes in said guide link plate and pressed fitted in said pin holes in each of said guide plates, having an outside distance substantially equal to an outside distance between said pin holes in said guide link plate.

2. A silent chain according to claim 1, wherein the difference between said outside distance of said two adjacent connector pins and said outside distance of said pin holes in said guide link plate is less than 0.5% of a pitch of said silent chain.

* * * * *

UNITED STATES PATENT AND TRADEMARK OFFICE
CERTIFICATE OF CORRECTION

PATENT NO. : 6,485,385 B2
DATED : November 26, 2002
INVENTOR(S) : Kazuhiko Shimaya It is certified that error appears in the above-identified patent and that said Letters Patent is hereby corrected as shown below:

<u>Title page,</u>
Item [*], Notice, change "7 days" to -- 0 days --;

<u>Column 1,</u>
Line 18, "rile" should read -- the --;

<u>Column 2,</u>
Line 56, "chair" should read -- chain --;
Line 61, "eah" should read -- each --;
Line 64, "he" should read -- the --;

<u>Column 3,</u>
Line 22, the "." after "by" should be deleted;
Line 56, "(Equal" should be changed to -- equal --;
Line 59, "It" should be changed to -- it --;

<u>Column 4,</u>
Line 12, "extent" should read -- extend --;
Line 56, "here" should read -- there --;

<u>Column 5,</u>
Line 25, "ink" should read -- link --;
Line 47, "if" should read -- of --;

<u>Column 6,</u>
Line 18, "surfaces" should read -- surface --;
Line 61, "tie" should read -- the --;

UNITED STATES PATENT AND TRADEMARK OFFICE
CERTIFICATE OF CORRECTION

PATENT NO.     : 6,485,385 B2
DATED          : November 26, 2002
INVENTOR(S)    : Kazuhiko Shimaya It is certified that error appears in the above-identified patent and that said Letters Patent is hereby corrected as shown below:

Column 7,
Line 27, "tie" should read -- the --.

Signed and Sealed this

Twenty-fourth Day of June, 2003

JAMES E. ROGAN
*Director of the United States Patent and Trademark Office*